United States Patent
Driml et al.

(10) Patent No.: US 8,042,694 B2
(45) Date of Patent: Oct. 25, 2011

(54) GATHERED FILTER MEDIA FOR AN AIR FILTER AND METHOD OF MAKING SAME

(75) Inventors: Greg Driml, Kearney, NE (US); Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 1127 days.

(21) Appl. No.: 10/979,390

(22) Filed: Nov. 2, 2004

(65) Prior Publication Data

US 2006/0091066 A1    May 4, 2006

(51) Int. Cl.
- *B01D 29/07* (2006.01)
- *B31F 1/20* (2006.01)
- *B31F 1/00* (2006.01)
- *B01D 39/00* (2006.01)

(52) U.S. Cl. .................. 210/493.1; 210/493.5; 156/473; 156/470; 156/462; 156/210; 55/521

(58) Field of Classification Search .................. 210/767, 210/499, 493.5, 493.1, 503; 55/521, 527; 156/473, 470, 462, 210
See application file for complete search history.

(56) References Cited

U.S. PATENT DOCUMENTS

| | | | | |
|---|---|---|---|---|
| 1,943,080 A | * | 1/1934 | Langston | 118/44 |
| 1,947,066 A | * | 2/1934 | Sieg | 425/367 |
| 1,954,881 A | * | 4/1934 | List | 118/44 |
| 3,025,963 A | * | 3/1962 | Bauer | 210/493.4 |
| 3,676,247 A | * | 7/1972 | Morris et al. | 156/205 |
| 3,679,057 A | * | 7/1972 | Perez | 210/223 |
| 4,108,938 A | * | 8/1978 | Rosenblatt | 264/127 |
| 4,252,591 A | * | 2/1981 | Rosenberg | 156/203 |
| 4,257,790 A | * | 3/1981 | Bergquist et al. | 55/379 |
| 4,498,989 A | * | 2/1985 | Miyakawa et al. | |
| 4,579,698 A | * | 4/1986 | Meyering et al. | 264/41 |
| 4,589,983 A | * | 5/1986 | Wydevan | |
| 4,720,292 A | * | 1/1988 | Engel et al. | |
| H556 H | * | 12/1988 | Tarko | 156/379.8 |
| 4,798,575 A | | 1/1989 | Siversson | |
| 4,976,677 A | | 12/1990 | Siversson | |
| 5,238,474 A | * | 8/1993 | Kahlbaugh et al. | |
| 5,376,218 A | * | 12/1994 | Mito et al. | 156/474 |
| 5,389,175 A | | 2/1995 | Wenz | |
| 5,484,466 A | * | 1/1996 | Brown et al. | |

(Continued)

FOREIGN PATENT DOCUMENTS

EP    94107773.7    12/1994

(Continued)

OTHER PUBLICATIONS

U.S. Appl. No. 10/979,401, filed Nov. 2, 2004, Brown.*

(Continued)

*Primary Examiner* — Nam Nguyen
*Assistant Examiner* — Madeline Gonzalez
(74) *Attorney, Agent, or Firm* — Reinhart Boerner Van Deuren P.C.

(57) ABSTRACT

A filter media including a gathered sheet of porous filter material, is provided, together with an apparatus and method for fabricating such a gathered sheet of porous filter material. An improved filter apparatus incorporating such gathered porous filter material is also provided. By gathering the porous filter material, rather than forming convolutions through corrugating or pleating, as was done in the past, a desirable convoluted shape is achieved with little or no compression of the filter media.

23 Claims, 9 Drawing Sheets

U.S. PATENT DOCUMENTS

| | | | |
|---|---|---|---|
| 5,588,945 A * | 12/1996 | Lauderbaugh | 493/480 |
| 5,609,711 A * | 3/1997 | Miller | 156/292 |
| 5,792,247 A * | 8/1998 | Gillingham et al. | |
| 5,820,646 A * | 10/1998 | Gillingham et al. | |
| 5,895,574 A * | 4/1999 | Friedmann et al. | 210/443 |
| 5,902,364 A * | 5/1999 | Tokar et al. | |
| 6,022,305 A | 2/2000 | Choi et al. | |
| 6,179,890 B1 * | 1/2001 | Ramos et al. | |
| 6,190,432 B1 * | 2/2001 | Gieseke et al. | |
| 6,221,122 B1 * | 4/2001 | Gieseke et al. | |
| 6,235,195 B1 * | 5/2001 | Tokar | |
| 6,368,374 B1 * | 4/2002 | Tokar et al. | |
| 6,447,567 B1 * | 9/2002 | Ehrenberg | |
| 6,517,598 B2 * | 2/2003 | Anderson et al. | |
| 6,533,845 B2 * | 3/2003 | Tokar et al. | |
| 6,605,172 B1 * | 8/2003 | Anderson et al. | 156/199 |
| 6,610,117 B2 | 8/2003 | Gieseke et al. | |
| 6,610,126 B2 * | 8/2003 | Xu et al. | |
| 6,610,177 B2 * | 8/2003 | Tsay et al. | |
| 6,673,136 B2 * | 1/2004 | Gillingham et al. | |
| 6,743,317 B2 * | 6/2004 | Wydeven | |
| 6,746,518 B2 * | 6/2004 | Gieseke et al. | |
| 6,783,565 B2 * | 8/2004 | Gieseke et al. | |
| 6,946,012 B1 * | 9/2005 | Miller et al. | 55/521 |
| 6,966,940 B2 * | 11/2005 | Krisko et al. | |
| 2002/0100262 A1 * | 8/2002 | Gieseke et al. | |
| 2003/0121845 A1 | 7/2003 | Wagner et al. | |
| 2003/0146149 A1 * | 8/2003 | Binder et al. | |
| 2003/0217534 A1 * | 11/2003 | Krisko et al. | |
| 2006/0091061 A1 * | 5/2006 | Brown | |
| 2006/0091064 A1 * | 5/2006 | Brown et al. | |
| 2006/0091084 A1 * | 5/2006 | Merritt et al. | |

FOREIGN PATENT DOCUMENTS

| | | |
|---|---|---|
| JP | S60-112320 | 7/1985 |
| JP | S60-124622 | 8/1985 |
| JP | 63-122617 | 6/1988 |
| JP | HEI 2-31131 | 8/1990 |

OTHER PUBLICATIONS

U.S. Appl. No. 10/979,876, filed Nov. 2, 2004, Brown et al.*
U.S. Appl. No. 10/979,987, filed Nov. 3, 2004, Johnston.*
U.S. Appl. No. 11/355,064, filed Feb. 15, 2006, Wydeven et al.*
U.S. Appl. No. 11/357,788, filed Feb. 17, 2006, Merritt.*
European Patent Office, Notification of Transmittal of the International Search Report and the Written Opinion of the International Searching Authority or Declaration of International Application No. PCT/US2005/031674, date of mailing Feb. 15, 2006; 10 pages.

* cited by examiner

GATHERED FILTER MEDIA FOR AN AIR FILTER AND METHOD OF MAKING SAME

FIELD OF THE INVENTION

This invention relates to fluid filters for removing particulate matter from a flow of fluid in liquid or gaseous form, including filters of the type used for filtering inlet air supplied to machinery such as engines and compressors.

BACKGROUND OF THE INVENTION

Filters of the type used for filtering particulate matter from engine intake air sometimes include one or more layers of a porous filter material that is formed into a convoluted pattern, often referred to in the industry as fluted filter media. One type of porous filter material commonly used for such filters is a cardboard or paper-type material having a thickness in the range of 0.006 to 0.008 inches. This material is somewhat stiff, and not easily bent or formed, without special provisions being made to prevent tearing or breaking the material. Although it is desirable to use a media of this type having a greater thickness, in the range of 0.012 to 0.018 inches for example, such thicker media has not been used in the past due to difficulties inherent in forming such stiff materials into a compact convoluted shape.

In the past, such fluted filter media was typically formed by processes which required, or resulted in the porous filter material being at least locally compressed during the process of forming the convolutions. Compression of the porous filter media is undesirable because it reduces the filtering efficiency and particulate holding capacity of the fluted filter media below what it could be if the porous filter media could be formed into a convoluted shape without compression of the media. The degree and unavoidability of such compression in the past would have essentially negated any advantage gained by using a thicker media, even if the problem of breakage or tearing could have been resolved.

In one widely utilized prior approach to forming a convoluted media, the porous filter material is fed through a corrugating machine, between a pair of rollers having intermeshing wavy surfaces which pinch and crimp the porous media in a manner that compresses and permanently deforms the filter media into a convoluted shape that is generally self supporting, and able to maintain the convoluted shape following corrugation, regardless of whether or not the corrugations are constrained. United States patent application number US 2003/0121845 A1, to Wagner, et al, discloses such an approach.

Corrugation typically compresses the porous filter material by 25 to 40 percent from its thickness prior to being corrugated, resulting in a significant reduction in efficiency and effectiveness, particularly where the media prior to corrugating has a thickness only in the range of 0.006 to 0.008 inches. It is also typically necessary, for paper filter media of the type often used in air filters, to expose the porous filter media to a water spray, steam, and heat, during the corrugation process in order to achieve a corrugated product that is self supporting. These additional processing requirements add undesirable cost and complexity to the manufacture of corrugated filter media, and exacerbate compression of the filter media during corrugation.

In another widely utilized prior approach to forming a fluted filter media, the porous material is pleated, rather than corrugated, by first feeding a sheet of porous media between a pair of cylinders or toothed belts having ridges which locally compress the porous material at periodic intervals, to thereby crease or score the material. The scored material is then fed through a folding mechanism which causes the scored media to fold at the scoring into a pleated shape. Such pleated shapes are not generally as self supporting as corrugated media, requiring that the pleats be constrained and held in an equally spaced relationship by a spacing mechanism, until they can be joined to a face sheet or secured to a support structure. U.S. Pat. Nos. 4,798,575 and 4,976,677 to Siversson, U.S. Pat. No. 5,389,175 to Wenz, and U.S. Pat. No. 6,022,305 to Choi, et al, disclose such pleated methods and pleated filter media. Where it is desired to set the pleats into a self supporting form, liquids sprayed onto the porous media, and sequentially applied heating and cooling are sometimes utilized, in the same manner described above in relation to corrugated filter media.

As was the case with corrugated media, in pleated media the scoring undesirably reduces the thickness of the porous media, thereby reducing its filtering effectiveness and efficiency. Also, the mechanisms required for sequentially scoring, forming, spacing, spraying, heating and cooling the pleated media undesirably increase the complexity and cost of manufacturing the pleated media.

It is desirable, therefore, to provide an improved filter media, together with an apparatus and method for manufacturing such an improved media. It is also desirable to provide an improved filter apparatus incorporating such an improved filter media.

BRIEF SUMMARY OF THE INVENTION

The invention provides a filter media including a gathered sheet of porous filter material, together with an apparatus and method for fabricating such a gathered sheet of porous filter material, and an improved filter apparatus incorporating such gathered porous filter material. By gathering the porous filter material, rather than forming convolutions through corrugating of pleating, as was done in the past, a desirable convoluted shape is achieved with little or no compression of the filter media, thereby resulting in improved filtering efficiency and effectiveness, and reduced complexity and cost of manufacture. It is also generally not necessary to expose the porous media to heat, steam, or liquid sprays or immersion during the process of forming a gathered media, according to the invention. The invention also allows porous materials to be used for forming the media that are considerably thicker than those which could be used in the past.

In one form of the invention, a filter media having a gathered sheet of porous material is provided. The thickness of the porous material in the gathered sheet may be the same as the thickness of the porous sheet prior to gathering. The filter media may also include a face sheet attached to the gathered sheet, for retaining the gathered sheet of porous material in a gathered state.

A filter apparatus, according to the invention, has one or more layers of a filter media including a gathered sheet of porous filter material. The filter apparatus may comprise a filter cartridge, adapted for attachment to a filter assembly, but not including the filter assembly. Such a filter cartridge may comprise a coil of the gathered media.

A filter apparatus, according to the invention, may alternatively take the form of a filter assembly adapted for attachment thereto of a filter cartridge, and a filter cartridge including one or more layers of a filter media comprising a gathered sheet of porous filter material. The filter cartridge, in such a filter apparatus, may comprise a coil of the gathered porous filter material.

An apparatus and method, according to the invention, include forming a filter media having a gathered sheet of porous filter material, by feeding a sheet of porous filter material between a first and a second gathering roller of an apparatus wherein the first and the second gathering rollers each include an outer periphery thereof having a plurality of circumferentially spaced protrusions extending radially therefrom. The first and second gathering rollers are mounted for rotation in a spaced and timed relationship to one another such that the protrusions of one gathering roller are disposed between adjacent protrusions of the other gathering roller for forming gathers in the sheet of porous filter material as it is fed between the first and second gathering rollers. The protrusions and outer peripheries of the first and second gathering rollers are configured and spaced from one another such that the sheet of porous material is not compressed between any portion of the outer periphery or protrusions of the first gathering roller and any portion of the outer periphery or protrusions of the second gathering rollers.

An apparatus and method, according to the invention, may also constrain the gathers of a gathered portion of the sheet of porous filter material within the spaces between adjacent protrusions of one of the gathering rollers after the gathered portion of the sheet has passed between the gathering rollers, and provide for attachment of a face sheet to the gathered sheet of porous filter material.

Other aspects, objectives and advantages of the invention will be apparent from the following detailed description and the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
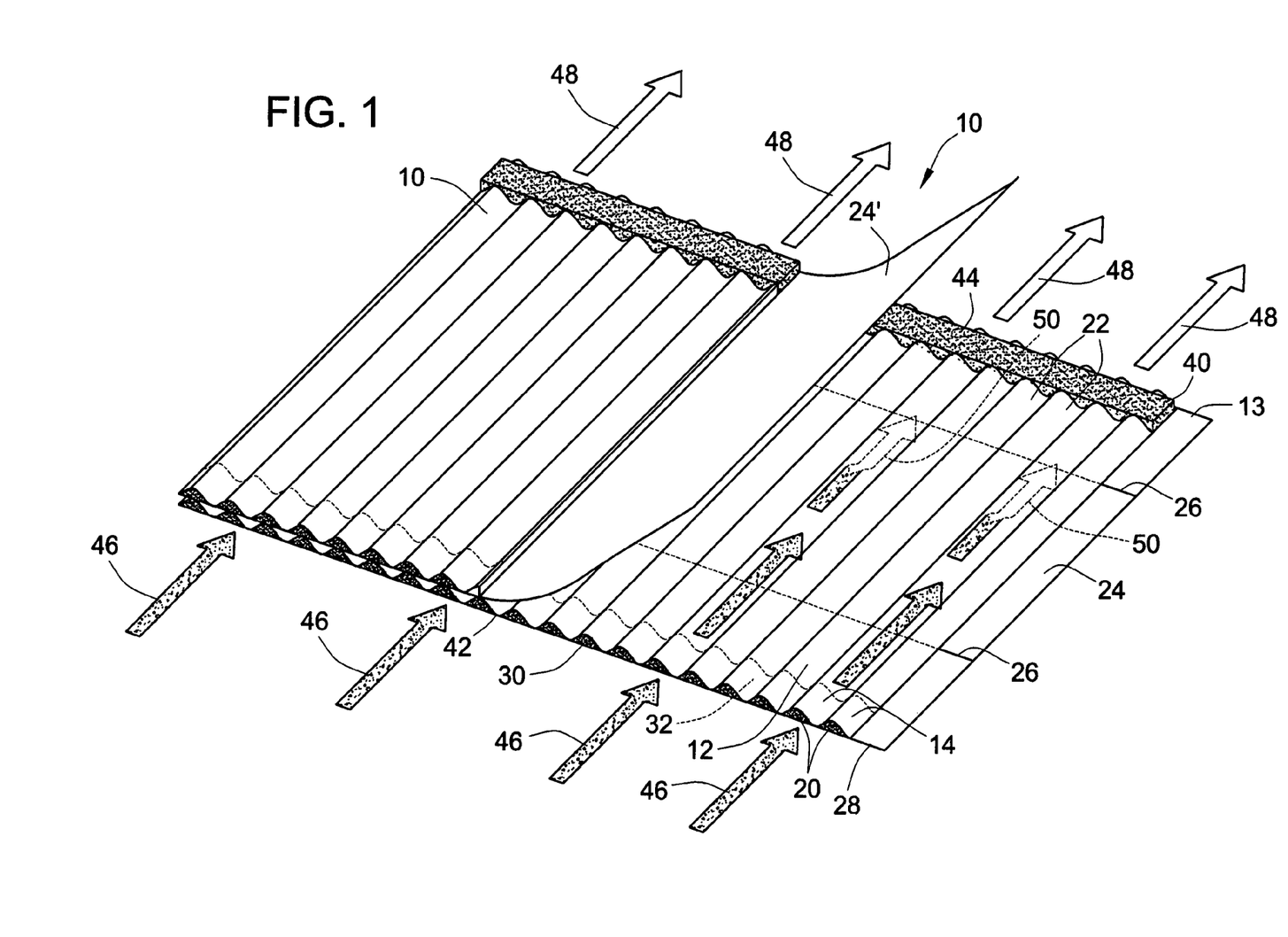
FIG. 1 is a perspective view of a first exemplary embodiment of the invention, in the form of a filter media including a gathered sheet of porous filter material.

FIG. 1 shows a first exemplary embodiment of the invention in the form of a filter media 10 comprising, a gathered sheet 12 of relatively stiff, paper-like, porous filter material of the type typically used for air filters. Such relatively stiff, paper-like porous filter materials are available in various thicknesses from suppliers including Ahlstrom Engine Filtration, LLC, of Madisonville, Ky. Specifically, it is contemplated that filter materials marketed by Ahlstrom, such as Ahlstrom part numbers 19N-1 or 23N-3, or other filter materials having physical characteristics similar to those tabulated in below, can be used with efficacy, according to the invention in providing an embodiment of the invention for use in a typical air filter of the type used for engine air intakes.

Ahlstrom 19N-1 Filter Media
100% cellulose fibers
Basis weight=70 pounds per 3000 square feet
Flat sheet caliper=14.5 mils
Grooved sheet caliper=18 mils
Frazier (CFM) 11-19, preferably 14
SD Gurley Stiffness (mg)=3000

Ahlstrom 23N-3 Filter Media
100% cellulose fibers
Basis weight=55 pounds per 3000 square feet
Flat sheet caliper=13 mils
Non-grooved sheet
Frazier (CFM) 11-19
SD Gurley Stiffness (mg)=1300

The Ahlstrom 19N-1 product is available with small grooves cut into the media for improving dirt holding capability. Theses grooves run the length of a roll of the filter media and, as will be apparent from the description below, are thus preferably, but not necessarily, oriented perpendicular to the direction of the peaks and valleys of the gathers in a gathered sheet of media, according to the invention.

As used herein, the term "gathered" is intended to mean that the sheet of porous material is guided into a final undulating or convoluted form, primarily by pulling the sheet of porous material over a series of protrusions extending from rotating gathering rollers, in such a manner that the porous filter material preferably experiences little or no compression, and in any event, substantially less compression than was typically required for forming prior corrugated or pleated filter medias. Because the undulating form of the gathered sheet of porous filter media is achieved by pulling the sheet of material over a series of protrusions, in a manner described in more detail below, the sheet of porous material has a thickness t prior to gathering, and a thickness t after gathering that is both substantially uniform throughout and substantially equal to the thickness t of the porous material prior to gathering.

Those having skill in the art will recognize that various embodiments of the invention, including all exemplary embodiments thereof specifically disclosed herein, may include a filter media including a gathered sheet of relatively stiff, paper-like, porous filter material of the type described in relation to the first embodiment. Those having skill in the art will also recognize that because the filter material is gathered, according to the present invention, rather than being pleated or corrugated as was the case for prior filter medias, the present invention allows relatively stiff, paper-like, porous filter materials of the type typically used for air filters to be utilized for forming undulating or convoluted filter medias in a manner that is more efficient and effective than prior forming methods.

Figure 2:
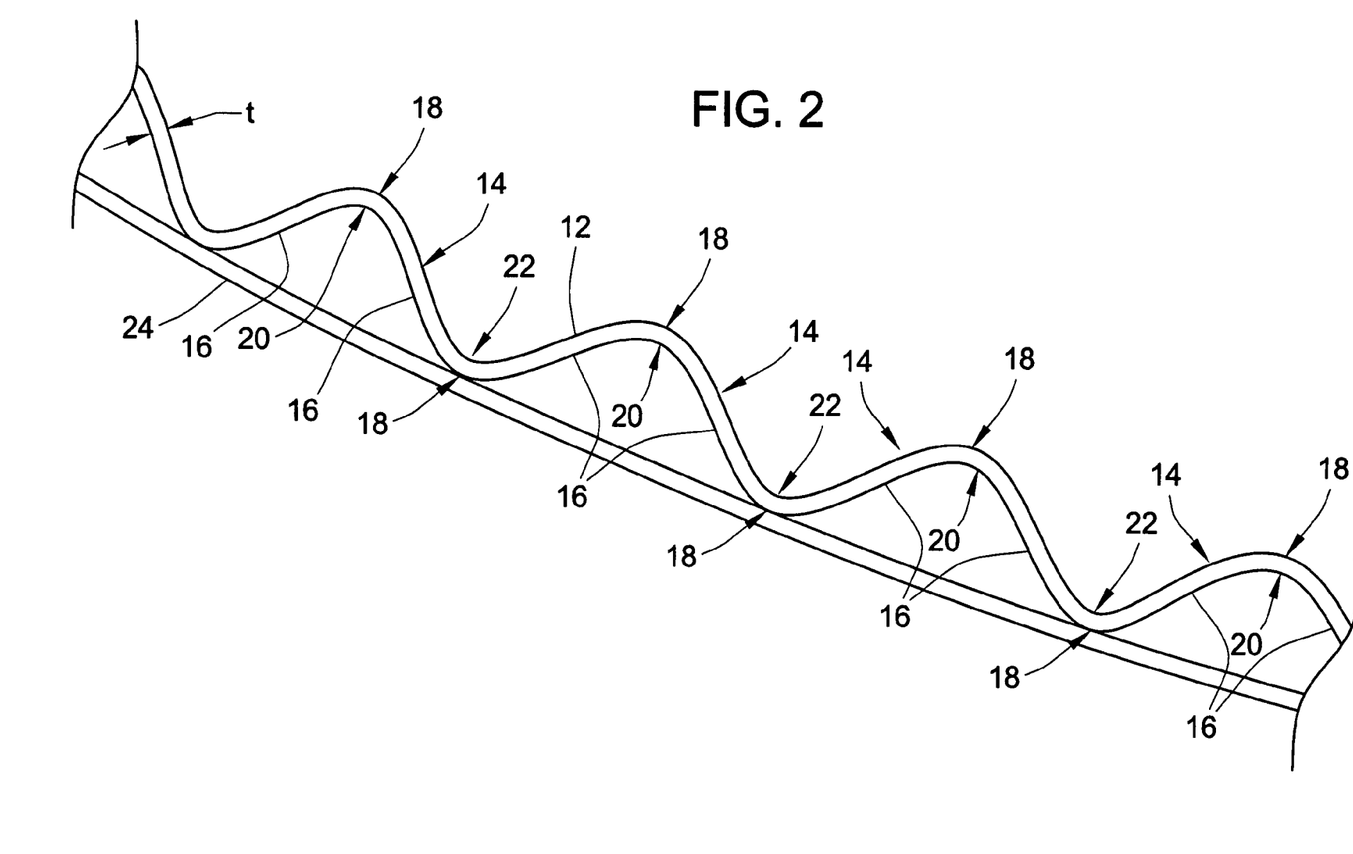
FIG. 2 is an enlarged cross section of the filter media of the first exemplary embodiment of FIG. 1.

As shown in an enlarged cross section in FIG. 2, the gathered sheet 12 forms a plurality of contiguous adjacent gathers 14, each having a generally V-shaped cross section with substantially straight side walls 16 joined by radiused bights 18 to form alternating peaks 20 and valleys 22. The peaks 20 and valleys 22 formed by the gathers 14 of the exemplary embodiment of the filter media 10 are substantially equal in size and equally spaced but, in other embodiments of the invention, this need not necessarily be the case.

As shown in FIGS. 1 and 2, the filter media 10 of the exemplary embodiment includes a face sheet 24 attached to the gathered sheet 12, for retaining the gathered sheet 12 of porous filter material in a gathered state. The face sheet 24 may be attached to the gathered sheet 12 in any appropriate manner, such as by beads of adhesive 26, applied at the juncture of the gathered sheet 12 and the face sheet 24, as shown in FIG. 1. In the exemplary embodiment of the filter media 10, the face sheet 24 is also made of a porous filter material.

As shown in FIG. 1, the space between the peaks 20 of the gathers 14 and the face sheet 24, along one edge 28 of the filter media 10 have a sealant 30 disposed in them, to thereby form a sealed portion 32 of the gathers 14 that blocks a flow of fluid through the sealed portion 32. In the exemplary embodiment of the filter media 10, this sealed portion extends all along the one edge 28 of the filter media 10, blocking flow through all of the peaks 20 along the edge 28.

Figure 3:
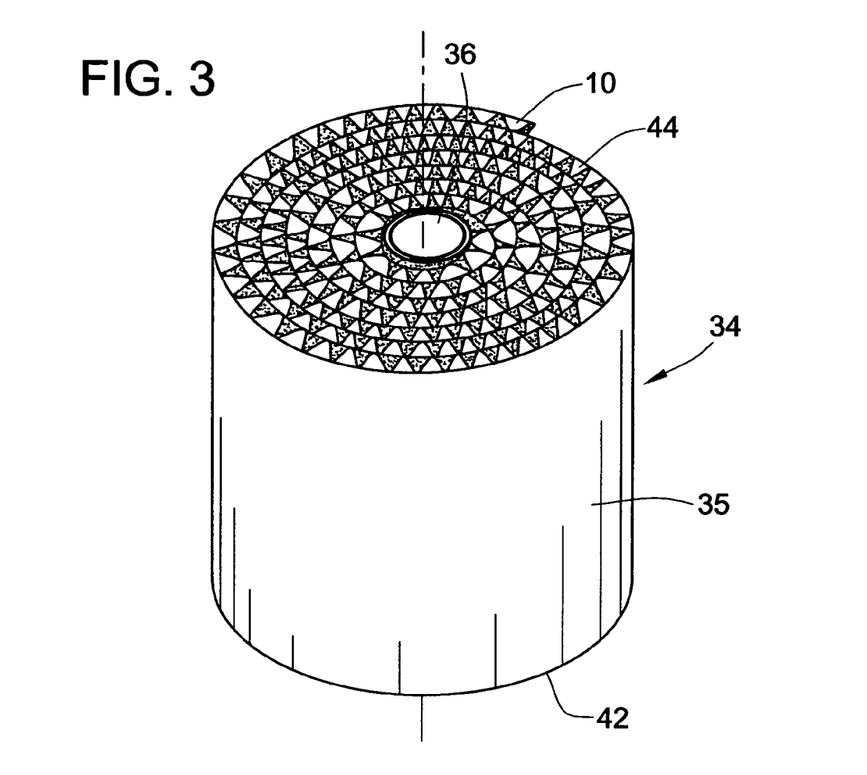
FIG. 3 is a perspective view of a coil of gathered filter media, according to the invention.
Figure 4:
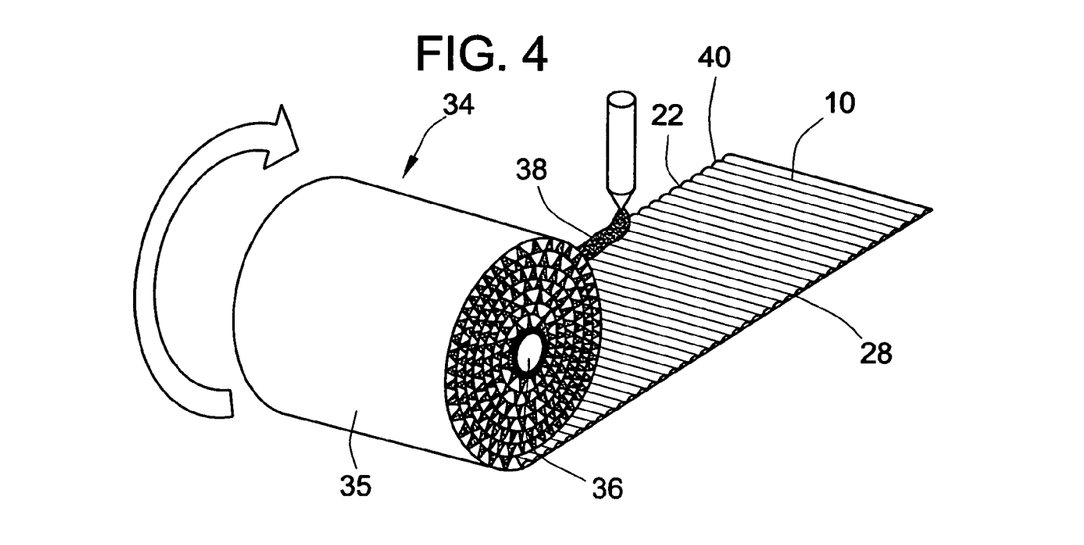
FIG. 4 is a perspective view showing a method of constructing the coil of filter material of FIG. 3.
Figure 5:
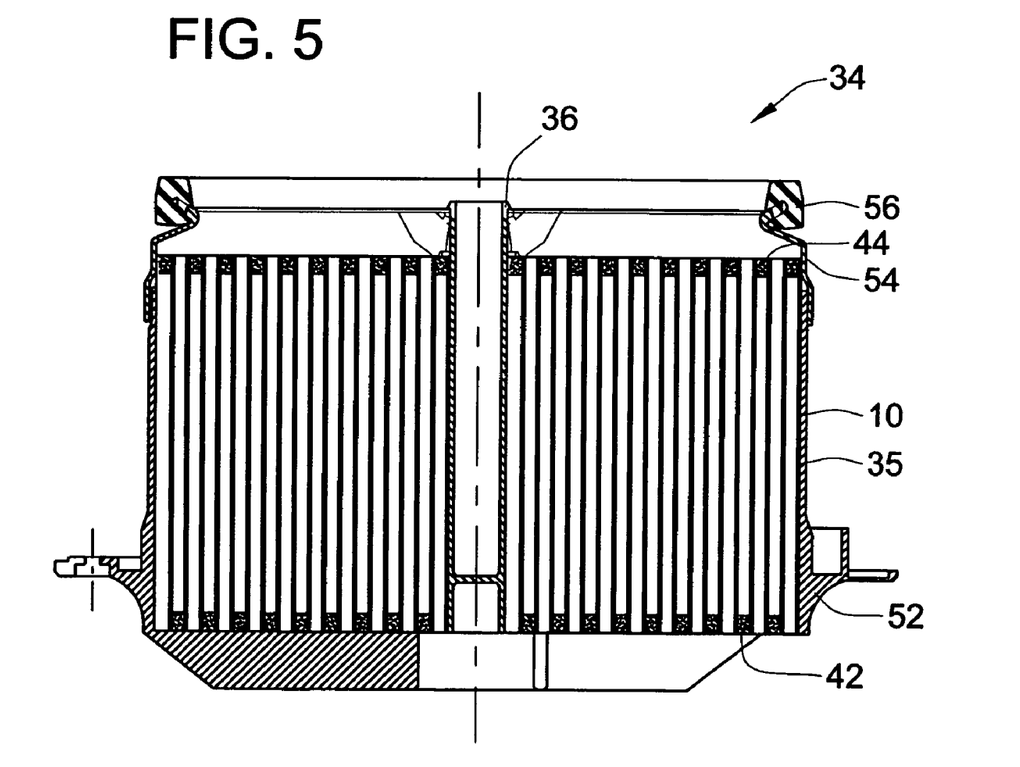
FIG. 5 is a cross section of a second exemplary embodiment of the invention, in the form of a filter cartridge, adapted for attachment to a filter assembly, but not including the filter assembly.

FIGS. 3-5 show a second exemplary embodiment of the invention in the form of a filter cartridge 34, including a coil 35 (FIG. 3) of a gathered filter media, according to the invention. In the second exemplary embodiment, the filter media shown in FIG. 3 is the gathered filter media 10, as described above in regard to FIGS. 1 and 2. In other embodiments of a filter cartridge, according to the invention, however, it will be understood that other forms of gathered filter media could be used. It will also be understood that the gathered filter media, in other embodiments of filter cartridges according to the invention, need not be coiled, but could be formed in other ways, such as by stacking or otherwise laminating layers of gathered filter media.

As shown in FIGS. 3-5, the exemplary embodiment of a filter cartridge 34 is formed by winding the gathered filter media 10 around a central mandrel 36. As shown in FIG. 4, as the gathered filter media 10 is wound onto the mandrel 36, a second bead of sealant 38 is applied in the valleys 22 along the second edge 40 of the gathered filter media 10. As illustrated in FIG. 1, as the gathered filter material 10 is coiled, the face sheet 24' of each subsequent layer 15 of the media 10 is sequentially wrapped over the tops of the peaks 20 of the previously coiled layer 13 of gathered filter media 10. As noted above, the first bead of sealant 30 closes the flow areas bounded by the face sheet 24 and the peaks 20 of the gathered filter media 10, at one edge 28 of the gathered filter media 10. The second bead of sealant 38 closes the flow area bounded by the face sheet 24 and the valleys 22 of the gathered filter media 10 at the other edge 40 of the gathered filter media 10.

By virtue of this construction, one end 42 of the filter cartridge 34 is formed by the first edge 28 of the coiled gathered filter media 10, and the other end 44 of the filter cartridge 34 is formed by the second edge 40 of the coiled gathered filter media 10. As a result, at the one end 42 of the filter cartridge 10, the air passages formed by the face sheet 24 and the valleys 22 are open for receiving air flow, as shown by inflow arrows 46 in FIG. 1, and the air passages formed by the peaks 20 are blocked by the first bead of sealant 30. At the other end 44 of the filter cartridge 10, however, the air passages formed by the face sheet 24' of the subsequent layer 15 of media 10 and the valleys 22 of the preceding layer 13 of media 10 are blocked by the second bead of sealant 38, and the air passages formed in the preceding layer 13 by the peaks 20 of the and the face sheet 24 are open to allow flow, as shown by outflow arrows 48 in FIG. 1. As shown by crossover arrows 50, in FIG. 1, the airflow must pass through the gathers 14 of the gathered filter media 10 in order to flow through the filter cartridge 34.

As shown in FIG. 5, the exemplary embodiment of the filter cartridge 34 also includes a bolting ring 52 fastened to the one end 42 of the filter cartridge 34. A seal support ring 54 is fastened to the other end 44 of the filter cartridge 34, and supports a resilient seal 56. The bolting ring 52, seal support ring 54 and resilient seal 56 are provided to adapt the filter cartridge 34 for attachment to a filter assembly.

It will be understood, however, by those having skill in the art, that the first exemplary embodiment of a filter apparatus, according to the invention, in the form of the filter cartridge 34, does not include the filter assembly, but is intentionally limited to a filter apparatus including only a filter cartridge in accordance with the invention, as defined in the appended claims.

Figure 6:
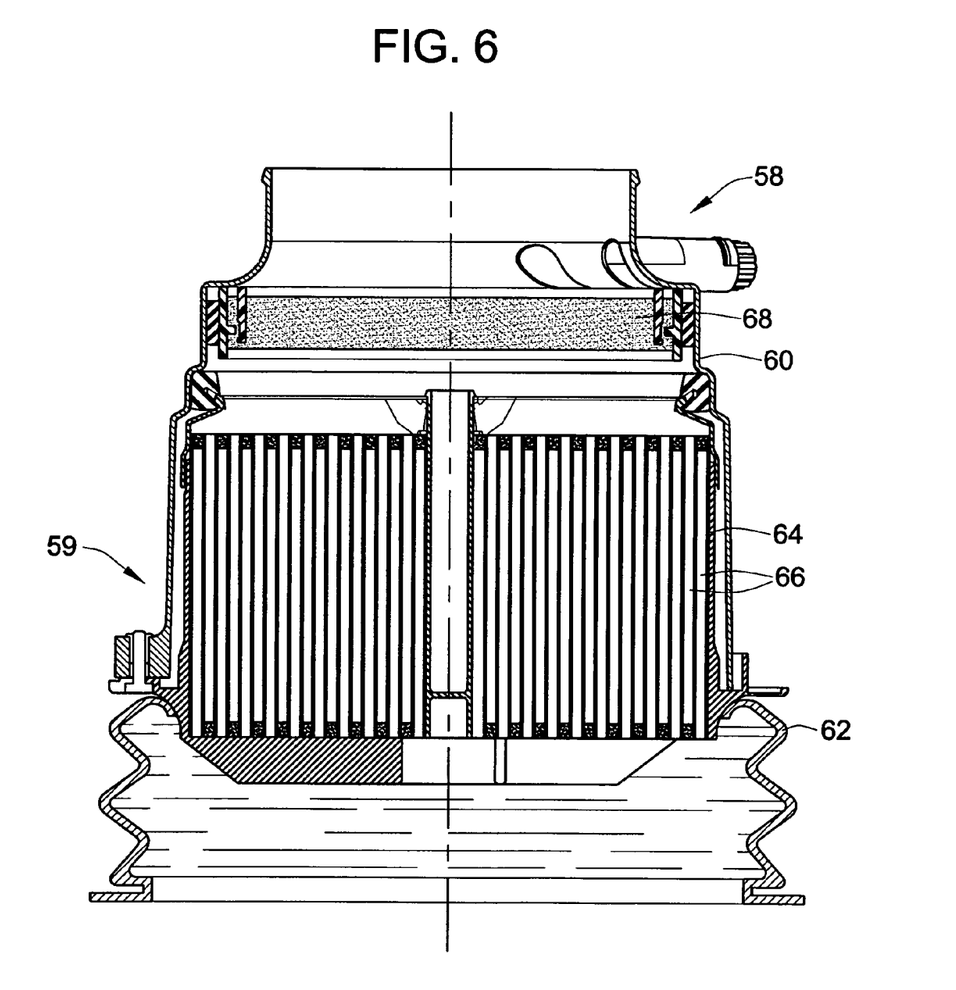
FIG. 6 is a cross sectional view of a third exemplary embodiment of the invention in the form of a filter apparatus, according to the invention, including a filter assembly and a filter cartridge attached to the filter assembly.

It will be further understood that, in other embodiments of a filter apparatus comprising only a filter cartridge, according to the invention, the construction of such embodiments of filter cartridges may differ considerably from the exemplary embodiment of the filter cartridge 34 disclosed herein. For example, the cartridge 34 may have other shapes, such as oblong, square, or rectangular. In some embodiments, a filter cartridge according to the invention may include only a coiled or otherwise laminated structure formed from a gathered porous filter media according to the invention, without attachment and sealing features, such as the bolting ring 52, seal support ring 54 and resilient seal 56 of the exemplary embodiment of the filter cartridge 34 disclosed herein. Where a coiled construction is used, the central mandrel 36 may be eliminated, and the winding may be carried out around a central crushed portion of the gathered filter media 10, in a manner similar to that used in the past for filters having corrugated filter medias. Many arrangements for adapting the filter cartridge for attachment to the filter assembly, other than those disclosed with regard to the exemplary embodiment of the filter cartridge 34, may be used in other embodiments FIG. 6 shows a third exemplary embodiment of the invention, in the form of a filter apparatus 58, including a filter assembly 59 in the form of a filter housing 60 and a boot 62, adapted for attachment thereto of a filter cartridge 64 having one or more layers of a filter media 66 comprising a gathered sheet of porous filter material. The filter cartridge 64 includes a coil of gathered porous filter material, in the same manner as the filter cartridge 54 of the second exemplary embodiment of the invention described above. In contrast to the second exemplary embodiment of the invention, in which the filter apparatus included only the filter cartridge 10, and not the filter assembly to which the cartridge is adapted to be attached, the third exemplary embodiment of the invention includes both the filter cartridge 64 and the filter assembly 59 formed by the housing 60 and the boot 62. It should be further noted that the filter apparatus 58 of the third exemplary embodiment also includes a safety filter 68, mounted in the filter housing 60 at a point in the airflow path downstream from the filter cartridge 64.

Figure 7:
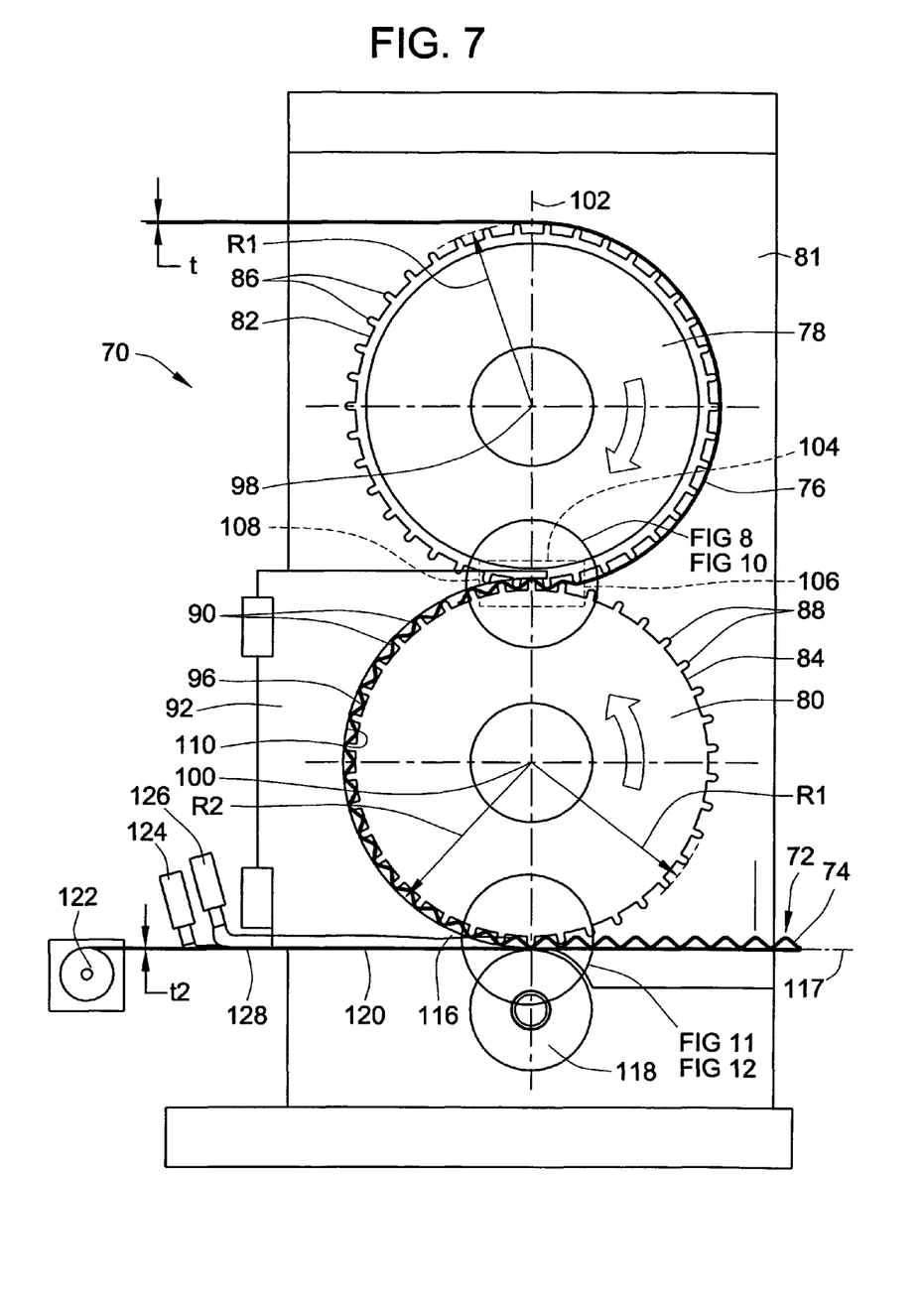
FIG. 7 is a schematic side view of a fourth embodiment of the invention, in the form of an apparatus for forming a filter media including a gathered sheet of porous filter material.

FIGS. 7-12 show a fourth exemplary embodiment of the invention in the form of a gathering apparatus 70 for forming a filter media 72 including a gathered sheet 74 of porous filter material 76. As shown in FIG. 7, the gathering apparatus 70 includes a first gathering roller 78 and a second gathering roller 80, each including an outer periphery 82, 84 thereof having a plurality of circumferentially spaced protrusions 86, 88 extending radially outward from the outer peripheries 82, 84 of the gathering rollers 78, 80.

Figure 8:
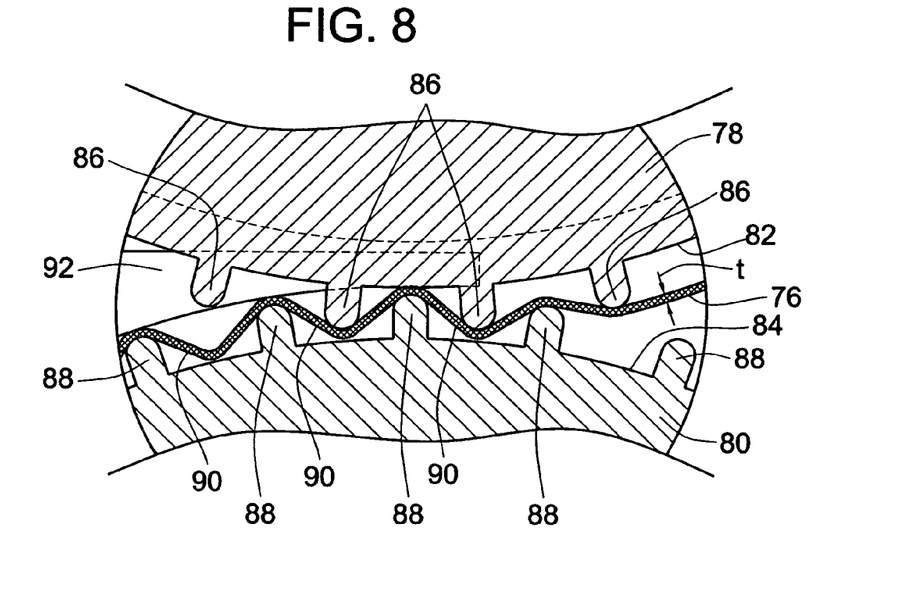
FIGS. 8 and 10-12 are enlarged side views of portions of the apparatus of FIG. 7, taken in areas as indicated in FIGS. 7 and 9.

As shown in FIGS. 7 and 8, the first and second gathering rollers 78, 80 are mounted in a frame 81 for rotation in a spaced and timed relationship to one another such that the protrusions 88 of the second gathering roller 80 are disposed between adjacent protrusions 86 of the first gathering roller 78, and vice versa, for forming gathers 90 in the sheet of porous filter material 76 as it is fed between the first and second gathering rollers 78, 80. The protrusions 86, 88 and outer peripheries 82, 84 of the first and second gathering rollers 78, 80 are configured and spaced from one another such that the sheet of porous filter material 76 is not compressed between any portion of the outer periphery 82 or protrusions 86 of the first gathering roller 78 and any portion of the outer periphery 84 or protrusions 88 of the second gathering roller 80. Specifically, the gathering rollers 78, 80 are configured and spaced from one another such that the thickness "t" of the porous filter material 76 is not compressed between the protrusions 86, 88 or outer periphery 82, 84 of either one of the gathering rollers 78, 80 and the outer periphery 84, 82 or the protrusions 88, 86 of the other gathering roller 80, 78.

In the exemplary embodiments of the invention described herein, it is contemplated that the thickness of the porous filter material 76 would fall within the range of 0.006 to 0.020 inches, with a preferred thickness for many applications being 0.014 inches. In other embodiments, however, a porous media having a thickness that is greater or less than the above stated range of 0.006 to 0.020 inches may also be used, with the actual selection of the thickness t being dependent upon the application and desired performance of the filter media.

Figure 9:
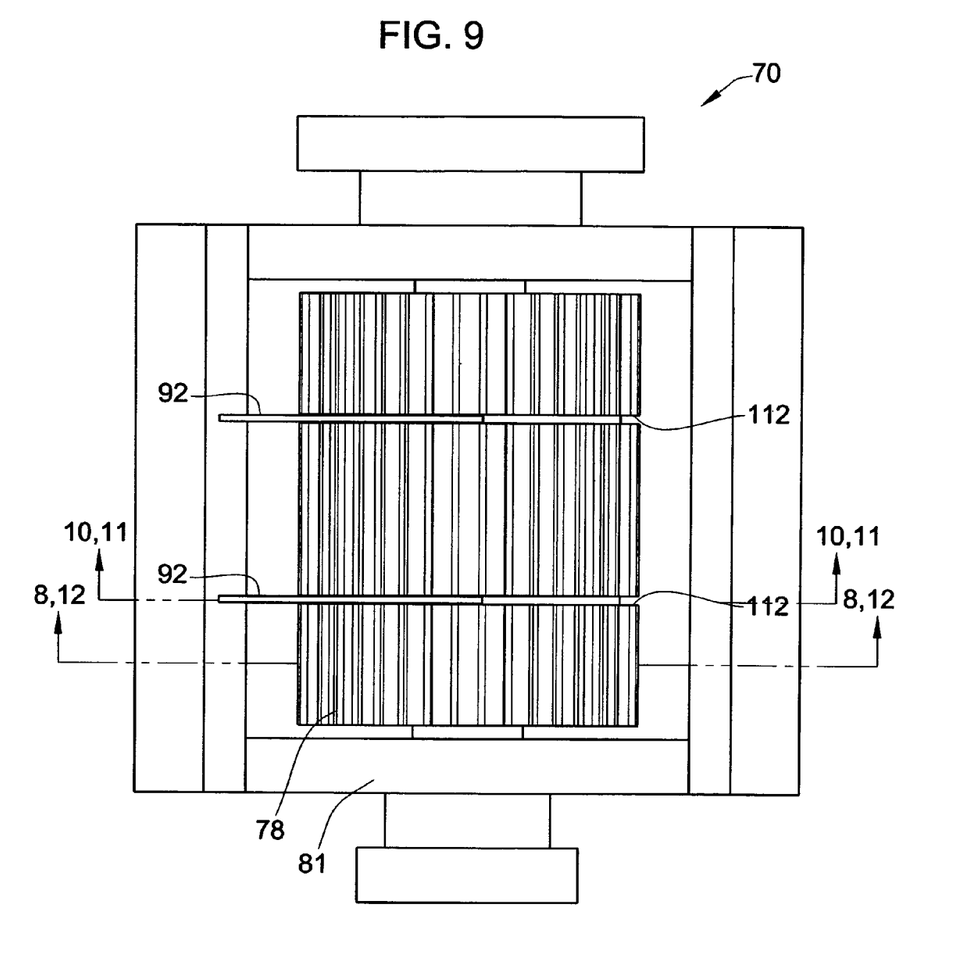
FIG. 9 is a top view of the apparatus of FIG. 7.
Figure 10:
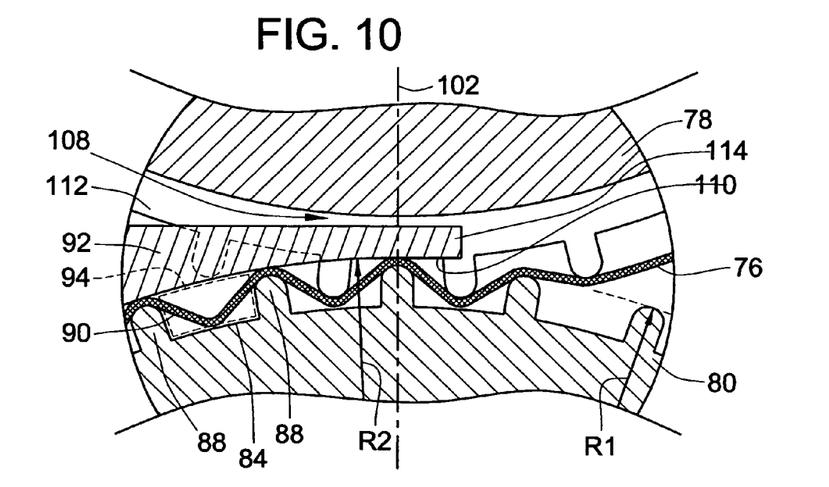

As shown in FIGS. 7-12, the gathering apparatus 70 also includes a pair of guides 92 adapted for maintaining the sheet 76 in a gathered state after the gathers 90 are formed by passage of the sheet 76 between the first and second gathering rollers 78, 80. As shown in FIG. 10, for both the first and second gathering rollers 78, 80, adjacent protrusions and a portion of the outer periphery of the gathering roller joining the adjacent protrusions define a space between the adjacent protrusions. For example, as shown in FIG. 10, adjacent protrusions 88 from the second gathering roller 80, and a portion of the outer periphery 84 of the second gathering roller 80 define a space 94 (as indicated by dashed lines) between the adjacent protrusions 88. The guides 92 constrain gathers 90 of a gathered portion 96 (as indicated in FIG. 7) of the sheet of porous filter material 76 within the spaces 94 between adjacent protrusions 88 of the second gathering roller 80 after the gathered portion 96 of the sheet 76 has passed between the gathering rollers 78, 80.

As shown in FIG. 7, the first gathering roller 78 is rotatable about an axis 98 of the first gathering roller 78 and the second gathering roller 80 is rotatable about an axis 100 of the second gathering roller 80, with the respective axes 98, 100 of the first and second gathering rollers 78, 80 being oriented parallel to one another (i.e. extending perpendicularly into and out of the paper in FIG. 7) and intersected by a common centerline 102 extending generally orthogonally to the axes 98, 100 of the first and second gathering rollers 78, 80.

The first and second gathering rollers are rotatable in opposite directions about their respective axes, as shown in FIG. 7 with the protrusions 86, 88 of each gathering roller 78, 80 extending into the spaces between adjacent protrusions 88, 86 of the other gathering roller 80, 78 to define a gathering zone 104, as shown in FIG. 7, having an infeed side 106 and an outfeed side 108 with respect to the common centerline 102. The protrusions 86, 88 on both the first and second gathering rollers 78, 80 enter into the gathering zone 104 from the infeed side 106, and exit the gathering zone 104 from the outfeed side 108, as the first and second gathering rollers 78, 80 are rotated in opposite directions, as illustrated in FIG. 7, about their respective axes 98, 100.

As shown in FIGS. 7 and 10, the protrusions 86, 88 on the first and second gathering rollers 78, 80 each define a distal end thereof, with the distal ends of the protrusions 86, 88 of each of the first and second gathering rollers 78, 80 respectively defining a maximum radius R1 of the first and second gathering rollers 78, 80 respectively. It should be noted that in the exemplary embodiment of the gathering apparatus 70, the first and second gathering rollers are identical, and therefore have identical maximum radii R1, but in other embodiments of the invention this need not be the case.

The guides 92 each define a generally C-shaped guide surface 110 of the guide 92 disposed primarily on the outfeed side 108 of the second gathering roller 80 and having a radius R2 centered on the axis 100 of the second gathering roller 80, with the radius R2 of the guide surfaces 92 (see FIGS. 7 and 10) substantially matching the maximum radius R1 of the second gathering roller 80 plus the thickness t of the sheet of porous filter material 76. In the Exemplary embodiment of the gathering apparatus 70, the radius R2 of the guide surfaces 92 also includes a clearance distance (not shown) to ensure that the thickness t of the porous filter material 76 is not compressed by the guide surface 110.

As best seen in FIGS. 9 and 10, in the exemplary embodiment of the apparatus 70, for forming a filter media 72 including a gathered sheet 74 of porous filter material 76, the first gathering roller 78 defines a pair of circumferentially oriented grooves 112 therein for receiving a portion of the guides 92. As best seen in FIGS. 7 and 10, the guides 92 each define a leading edge 114 thereof, extending into the gathering zone 104 from the outfeed side 108, and past the common centerline 102. The guides 92 also each include a trailing edge 116 thereof, as best seen in FIGS. 7 and 11, disposed on the outfeed side 108 of the common centerline 102.

In the exemplary embodiment of the gathering apparatus 70 for forming a filter media 72 including a gathered sheet 74 of porous filter material 76, the guide surfaces 110 extend substantially halfway around the second gathering roll 80, for constraining the gathers between the second gathering roll 80 and the guide surfaces 110. In other embodiments, however, the guide surfaces 110 may be shorter or longer than those of the exemplary embodiment of the apparatus 70.

Figure 11:
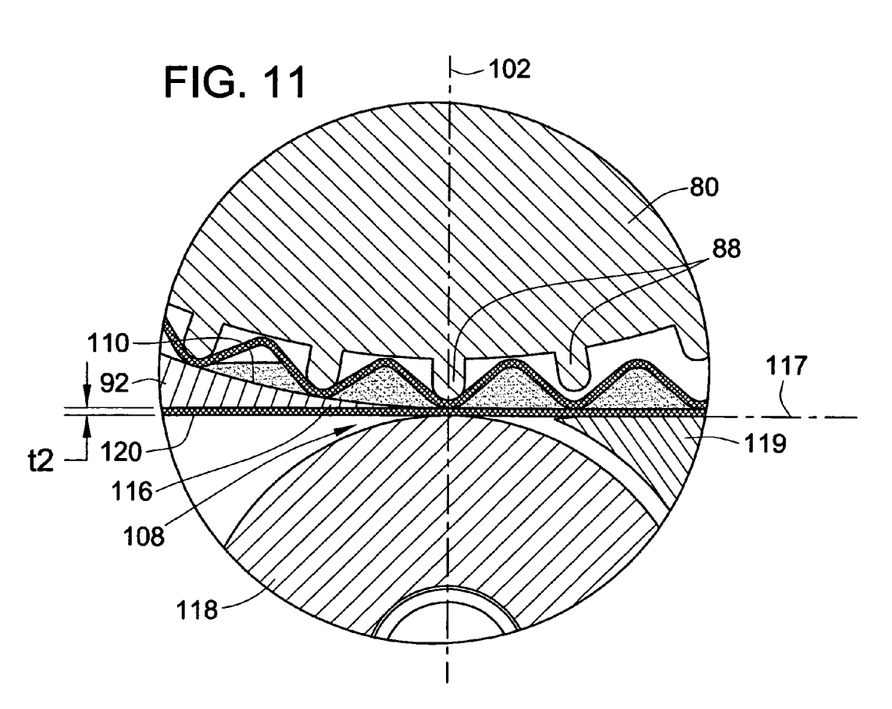

As best seen in FIGS. 7 and 11, the exemplary embodiment of the forming apparatus 70 further includes a second guide surface 117, formed by a second guide surface roller 118 and a second stationary guide surface 119, that are positioned adjacent the trailing edges 116 of the guide surfaces 110 of the guides 92, for receiving the gathered filter media 76 from the second gathering roller 80. The second guide surface 117 is spaced from the distal ends of the protrusions 88 on the second gathering roller 80 a distance substantially equal to the thickness t of the porous filter material 76 plus the thickness t2 of a face sheet 120, that is joined to the gathered sheet 74 of porous filter material 76, to form part of the filter media 72 and to retain the sheet 74 in a gathered condition.

By virtue of the construction recited above, the second gathering roller 80 is adapted for feeding the gathered sheet 72 of porous filter material 76 onto the second guide surface 117 at an outfeed speed, and the gathering apparatus 70 further comprises a face sheet feeder 122 adapted for feeding a face sheet 120 onto the second guide surface 117 at a speed substantially matching the outfeed speed of the gathered sheet 72 of porous filter material 76.

Figure 12:
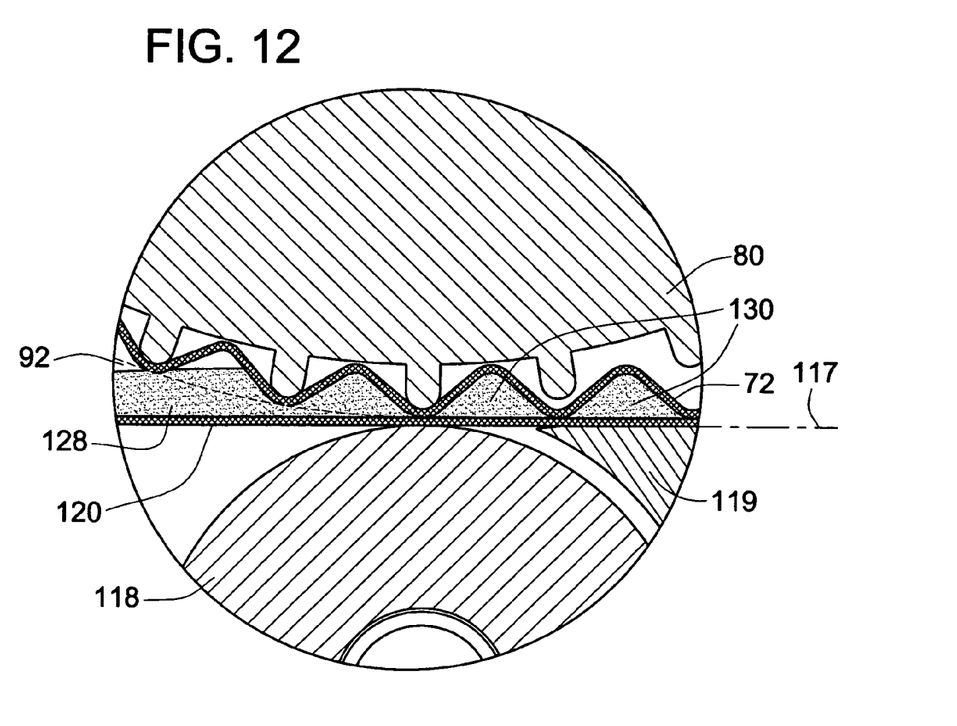

As shown in FIG. 7, the exemplary embodiment of the gathering apparatus 70, for forming a filter media 72 including a gathered sheet 74 of porous filter material 76, further includes both an adhesive feeder 124, and a sealant feeder 126. The adhesive feeder 124 is adapted for feeding an adhesive into a juncture of the face sheet 120 with the gathered sheet 72 of porous filter material 76, for bonding the face sheet 120 and gathered sheet 72 to one another. The sealant feeder 126 is adapted for feeding a sealant 128 onto the gathered sheet 72 of porous filter material 76, to form a sealed portion 130 thereof, as shown in FIG. 12.

It will also be noted that in the exemplary embodiment of the gathering apparatus 70, as shown in FIG. 7, the porous filter material 76 is wrapped around the first gathering roller 78, and fed into the gathering zone 104 by allowing it to slide across the distal ends of the protrusions 86 on the first gathering roller 78. It will be recognized that, by virtue of the gathering, the porous material 76 entering the gathering zone 104 slides across the distal ends of the protrusions 86, 88 on both the first and second gathering rollers 78, 80 at a speed greater than the peripheral tip speed of the distal ends of the protrusions 86, 88. This sliding motion of the porous material 76 entering the gathering zone 104 facilitates gathering of the porous material 76 in a manner that does not cause compression of the porous filter material 76. Feeding the porous material 76 around the distal ends of the protrusions 86 on the first gathering roller 78 also facilitates maintaining a proper tension on the porous filter material 76, so that no compression occurs due to excessive pulling on the material 76 as it is gathered.

Those having skill in the art will thus recognize that the present invention provides a number of advantages over prior corrugated and/or pleated filter medias, and the apparatuses and methods used to manufacture them. One particular advantage is that, in many embodiments of the invention, the gathered media of the present invention can be formed without having to expose the porous media to heat, steam, liquid spray or immersion, to facilitate formation of convolutions, as was the case in prior corrugated and pleated medias.

Those having skill in the art will also recognize that, although invention has been described herein with reference to several exemplary embodiments, many other embodiments of the invention are possible.

For example, although all of the exemplary embodiments of the apparatus and methods described herein have focused on gathered medias, it will be recognized that the apparatus and method for forming a media, according to the invention can be adapted for forming other types of convoluted filter media having some degree of compression of the porous media, by simply reducing the clearances between the elements of the gathering rollers to the point that some compression occurs. Although some of the effectiveness and efficiency of the media is lost where compression is allowed, those having skill in the art will recognize that the method and apparatus for forming the convolutions, and for guiding and constraining the formed convolutions in a preferred spacing, according to the invention, is considerably more straightforward than the methods and apparatuses that were previously available.

It will be further recognized that, although all of the exemplary embodiments or the apparatus and methods described herein have focused on a gathered media having first and second beads of sealant 32, 38 disposed at opposite edges 30, 40 of the media, the apparatus and method for forming a media, according to the invention can be adapted for forming other types of convoluted filter media having an intermediate seal, as disclosed in a US patent application bearing the Ser. No. 10/979,453, which is filed concurrently herewith and incorporated herein by reference.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for forming a filter media including a gathered sheet of porous filter material, the apparatus comprising:

a first and a second gathering roller, each including an outer periphery thereof having a plurality of circumferentially spaced round ended protrusions extending radially outward therefrom;

the first and second gathering rollers being mounted for rotation in a spaced and timed relationship to one another such that the protrusions of one gathering roller are disposed between adjacent protrusions of the other gathering roller, grooves being defined between adjacent protrusions, for forming gathers without folding or pleating in a sheet of porous filter material fed between the first and second gathering rollers, with the protrusions and outer peripheries of the first and second gathering rollers configured and spaced from one another such that the sheet of porous filter material is not compressed between any portion of the protrusions of the first gathering roller and any portion of the protrusions of the second gathering roller, and wherein the protrusions of each gathering roller do not seat at the bottoms of the grooves of the other gathering roller.

2. The apparatus of claim 1, wherein:

for both the first and second gathering rollers, adjacent protrusions and a portion of the outer periphery of the gathering roller joining the adjacent protrusions define a space between the adjacent protrusions; and the apparatus further comprises a guide for constraining gathers of a gathered portion of the sheet of porous filter material within the spaces between adjacent protrusions of one of the gathering rollers after the gathered portion of the sheet has passed between the gathering rollers.

3. The apparatus of claim 2, wherein:

the first gathering roller is rotatable about an axis of the first gathering roller and the second gathering rollers is rotatable about an axis of the second gathering roller, with the respective axes of the first and second gathering rollers being oriented parallel to one another and intersected by a common centerline extending generally orthogonally to the axes of the first and second gathering rollers;

the first and second gathering rollers are rotatable in opposite directions about their respective axes, with the protrusions of each gathering roller extending into the spaces between adjacent protrusions of the other gathering roller to define a gathering zone having an infeed side and an outfeed side with respect to the common centerline, and the protrusions on both the first and second gathering rollers entering into the gathering zone from the infeed side and exiting the gathering zone from the outfeed side as the first and second gathering rollers are rotated in opposite directions about their respective axes;

the protrusions on the first and second gathering rollers each define a distal end thereof, with the distal ends of the protrusions of each of the first and second gathering rollers respectively defining a maximum radius of the first and second gathering rollers respectively; and the guide defines a generally C-shaped guide surface of the guide disposed on the outfeed side of the second gathering roller and having a radius centered on the axis of the second gathering roller, with the radius of the guide surface substantially matching the maximum radius of the second gathering roller plus the thickness of the sheet of porous filter material.

4. The apparatus of claim 3, wherein the first gathering roller defines a circumferentially oriented groove therein for receiving a portion of the guide.

5. The apparatus of claim 3, wherein the radius of the guide surface further includes a clearance distance.

6. The apparatus of claim 3, wherein the guide defines a leading edge thereof extending into the gathering zone from the outfeed side and past the common centerline.

7. The apparatus of claim 3, wherein the guide surface includes a trailing edge thereof disposed in the outfeed side of the common centerline.

8. The apparatus of claim 3, wherein the guide surface extends substantially half way around the second gathering roll, for constraining the gathers between the second gathering roll and the guide surface.

9. The apparatus of claim 7, further comprising a second guide surface adjacent the trailing edge of the guide surface for receiving the gathered filter media from the second gathering roller.

10. The apparatus of claim 9, wherein the second guide surface is spaced from the distal ends of the protrusions on the second gathering roller a distance substantially equal to the thickness of the porous filter material plus the thickness of a face sheet.

11. The apparatus of claim 10, wherein the second gathering roller is adapted for feeding the gathered sheet of porous filter material onto the second guide surface at an outfeed speed, and the apparatus further comprises a face sheet feeder adapted for feeding a face sheet onto the second guide surface at a speed substantially matching the outfeed speed of the gathered sheet of porous filter material.

12. The apparatus of claim 11, further comprising an adhesive feeder adapted for feeding an adhesive into a juncture of the face sheet with the gathered sheet of porous filter material, for bonding the face sheet and gathered media to one another.

13. The apparatus of claim 11, further comprising a sealant feeder adapted for feeding a sealant onto the gathered sheet of porous filter material, to form a sealed portion thereof.

14. The apparatus of claim 1 wherein the each protrusions of the gathering rollers have a pair of substantially parallel side walls and a rounded end tip joining the sidewalls.

15. An apparatus for forming a filter media including a gathered sheet of porous filter material, the apparatus comprising:

a first and a second gathering roller, each including an outer periphery thereof having a plurality of circumferentially spaced protrusions extending radially outward therefrom;

the first and second gathering rollers being mounted for rotation in a spaced and timed relationship to one another such that the protrusions of one gathering roller are disposed between adjacent protrusions of the other gathering roller, grooves being defined between adjacent protrusions, for forming gathers in a sheet of porous filter material fed between the first and second gathering rollers, with the protrusions and outer peripheries of the first and second gathering rollers configured and spaced from one another such that the sheet of porous filter material is not compressed between any portion of the protrusions of the first gathering roller and any portion of the protrusions of the second gathering roller, and wherein the protrusions of each gathering roller do not seat at the bottoms of the grooves of the other gathering roller;

a guide along periphery of the second gathering roller adapted for transferring the gathered sheet of porous filter material in the gathered state is adapted and arranged along the periphery of the second gathering roller after the gathers are formed by passage of the sheet between the first and second gathering rollers.

16. The apparatus of claim 15, wherein the guide holding the gathered sheet of porous filter material in a convoluted but non corrugated and non pleated gathered state to prevent the gathered sheet from ungathering and loosing convolutions.

17. The apparatus of claim 15, further comprising a face sheet feeder feeding the face sheet and an adhesive feeder applying adhesive on the face sheet shortly before the guide releases the sheet of porous filter material in a convoluted but non corrugated and non pleated gathered state onto the adhesive applied side of the face sheet.

18. The apparatus of claim 17, further comprising a surface roller rotatable about an axis of the surface roller with the surface roller axis being oriented parallel to the axis of the second gathering roller and intersected by a common centerline extending generally orthogonally to the axis of the second gathering roller;

the second gathering roller and the surface roller rotating in opposite directions feeding the gathered sheet of porous filter material released from the guide and the adhesive applied face sheet between the gathering roller and the surface roller bonding the face sheet and gathered media to one another.

19. The apparatus of claim 17, wherein the second gathering roller and the surface roller are spaced such that a clearance between the protrusions of the second gathering roller and the surface of the surface roller is substantially equal to the thickness of the porous filter material, the thickness of the face sheet together with the thickness of the adhesive to prevent the porous filter material from compressed between the gathering roller and the surface roller.

20. The apparatus of claim 1, wherein the protrusions of the first gathering roller extend into the grooves of the second gathering roller, and wherein the protrusions of the second gathering roller extend into the first gathering roller.

21. The apparatus of claim 15, wherein the protrusions of the first gathering roller extend into the grooves of the second gathering roller, and wherein the protrusions of the second gathering roller extend into the first gathering roller.

22. The apparatus of claim 1, wherein the porous filter material retains a substantially constant thickness as the porous filter material passes through the first and second gathering rollers.

23. The apparatus of claim 15, wherein the porous filter material retains a substantially constant thickness as the porous filter material passes through the first and second gathering rollers.

* * * * *